United States Patent [19]

Brebner

[11] Patent Number: 5,508,321
[45] Date of Patent: Apr. 16, 1996

[54] INTUMESCENT SILICONE RUBBER COMPOSITION

[76] Inventor: Keith I. Brebner, 21 Regan Rd., Unit F, Brampton, Ontario, Canada

[21] Appl. No.: 328,283

[22] Filed: Oct. 5, 1994

Related U.S. Application Data

[63] Continuation-in-part of Ser. No. 260,752, Jun. 15, 1994, abandoned.

[51] Int. Cl.$^6$ .......................... C09K 21/02; C09K 21/14; C08K 5/54; C08K 3/34
[52] U.S. Cl. .................. 523/179; 521/86; 521/91; 521/154; 521/927; 524/268; 524/442
[58] Field of Search ................. 521/86, 91, 154, 521/907; 523/218, 179, 219; 524/268, 442, 495, 496

[56] References Cited

U.S. PATENT DOCUMENTS

| | | | |
|---|---|---|---|
| 4,218,502 | 8/1980 | Graham et al. | 523/209 |
| 4,273,829 | 6/1981 | Langer et al. | 521/91 |
| 4,588,523 | 5/1986 | Tashlick et al. | 106/18.12 |
| 4,599,369 | 7/1986 | Malcolm-Brown | 523/179 |
| 4,686,244 | 8/1987 | Dietlein et al. | 523/218 |
| 4,694,030 | 9/1987 | von Bonin et al. | 523/179 |
| 4,719,249 | 1/1988 | Dietlein et al. | 523/179 |
| 4,719,251 | 1/1988 | Dietlein et al. | 523/218 |
| 4,871,795 | 10/1989 | Pawar | 523/179 |
| 5,047,449 | 9/1991 | Pastureau | 523/179 |
| 5,262,454 | 11/1993 | Leroux et al. | 523/218 |

FOREIGN PATENT DOCUMENTS

| | | | |
|---|---|---|---|
| 445400A1 | 12/1990 | European Pat. Off. | |
| 469846A3 | 7/1991 | European Pat. Off. | |
| 469846A2 | 7/1991 | European Pat. Off. | |
| 508751A2 | 10/1992 | European Pat. Off. | |
| 508751A3 | 10/1992 | European Pat. Off. | |
| 519863A1 | 12/1992 | European Pat. Off. | |
| C08L83/04 | 8/1987 | Germany. | |
| 0100968 | 6/1982 | Japan | 523/179 |
| 8912669 | 6/1989 | WIPO. | |

*Primary Examiner*—Peter A. Szekely
*Attorney, Agent, or Firm*—McFadden, Fincham

[57] ABSTRACT

An intumescent silicone rubber composition is provided having an expandable intumescent material present in the composition by up to 20% by weight, a polyorganosiloxane oil present in an amount from about 10% to about 40% by weight of the composition, a hydrated alkali metal silicate present in an amount of up to 80% by weight of the composition and a silicone elastomer binder present in an amount from about 4% to about 30% by weight of the composition. The result is a very effective and relatively inexpensive composition which when used as firestop material around combustible pipe, such as PVC or ABS, readily meets the test criteria set forth under ASTM Standard E-814.

12 Claims, 1 Drawing Sheet

INTUMESCENT SILICONE RUBBER COMPOSITION

This is a continuation-in-part application of U.S. Ser. No. 08/260,752 filed Jun. 15, 1994, now abandoned.

The present invention relates to an intumescent composition and more particularly relates to a intumescent composition useful as a fire stop material which includes a polyorganosiloxane oil compound.

FIELD OF THE INVENTION

The present invention is useful to seal combustible pipes passing through fire separations when exposed to fire conditions. As the pipe softens and collapses, the rubber based compositions (in the form of a collar) must rapidly intumesce to fill the void and prevent the spread of the fire to the unexposed side of the fire separation. Typically, the intumescent composition is encased within a metal collar so that the intumescence is directed towards the pipe. The expanded composition must also resist the effects of erosion due to the turbulence and positive pressure of the fire for the duration of the rating of the assembly, typically a one or two hour period.

BACKGROUND OF THE INVENTION

Generally speaking, the phenomenon of intumescence using silicone rubber matrices is already known and has been set forth in the prior art. A typical reference is U.S. Pat. No. 5,047,449 issued to Pastureau, Sep. 10, 1991, for a fire protection material. The patentee provides a intumescent composition which includes a silicone elastomer (RTV-121) a reinforcing charge of a metal oxide, borax and an insulative charge of mica or vermiculite.

U.S. Pat. No. 5,262,454, issued to Leroux et al., Nov. 16, 1993, teaches a flame resistant polyorganosiloxane compound containing hollow glass balls and intumescent compound. The composition indicated in the disclosure includes the use of a relatively high percentage of hollow glass balls containing a non-combustible gas.

Further prior art in this area of technology includes European Patent Application 508751-A2, which teaches the use of a sodium silicate and expandable graphite in an aqueous system with a polyvinyl alcohol binder.

To effectively meet fire, temperature and hose stream requirements of ASTM Standard E-814, the release and amplitude of the intumescence must be controlled and limited. The use of a silicone binder has been generally considered advantageous in view of the fact that there is no production of toxic pyrolysis products in the case of fire.

Further prior art related to this art is Japanese Patent publications JP 0415169 and JP 04145178. These references generally refer to the combination of sodium silicate and foamed or sponge-like graphite powders for use in heat resistant coatings. Silicone and aluminum phosphate compounds have also been set forth as suitable binders for use in intumescent compositions.

Having regard to the intumescent compositions that have been previously set forth in the prior art, there exists a need for an intumescent composition which when used as firestop material around combustible pipe, such as PVC or ABS, readily meets the test criteria set forth under ASTM Standard E-814.

SUMMARY OF THE INVENTION

An intumescent composition comprising: an expandable intumescent material other than a hydrated alkali metal silicate for expanding the composition being present in an amount up to 20% by weight of said composition; a polyorganosiloxane oil compound present in an amount from about 10% to about 40% by weight of the composition; a hydrated alkali metal silicate present in an amount of up to 80% by weight of the composition; and a silicone elastomer binder present in an amount from about 4% to about 30%, by weight of the composition.

The composition of the invention was prepared by incorporating the intumescent materials into the silicone binder and more specifically the silicone elastomer base, by means of a planetary type mixer with vacuum capability, the latter being well known to those skilled in the art.

The silicone elastomer, as an example, was prepared by polycondensation of polydimethylsiloxanediol with a moisture cure crosslinker, such as methyl oximino silane, and further with the trace addition of a catalyst which is typically a tin salt, an example of which is dibutyl tin dilaurate. A polydimethylsiloxanediol, preferably with a viscosity of 50 to 80 Pa.s (50,000 to 80,000 CPS) at 25° C., was blended with a non-reactive polydimethylsiloxane oil terminally end-blocked with methyl groups, preferably having a viscosity of 1 Pa.s (1000 CPS) at 25° C. The oil enables relatively higher charges of alkali metal silicate to be accommodated and additionally softens the elastomer resulting in a greater free volume expansion of the composition at 250° C.

Generally speaking, the hydrated alkali metal silicate, preferably sodium silicate, should be in the form of a powder rather than a granular form so that the intumesced composition has a homogeneous foam structure. The silica to alkali weight ratio may be between about 2.00 and about 3.75:1.

As has been well recognized in this art, intumesced sodium silicate is resistant to erosion and eventually hardens under furnace or fire conditions. The refractoriness of the char that results once the product has been exposed to fire or furnace conditions, also increase with the increase of the silica to alkali ratio. For the purposes of illustration, BRITESIL®C24 with an intermediate silica to alkali weight ratio of 2.4:1 was used.

In a preferred form, the expandable intumescent material comprises expandable graphite having a rate of volume expansion of 80:1 and ASBURY CARBONS #3335 was used.

Having thus generally described the invention, reference will now be made to the accompanying drawings illustrating preferred embodiments.

Figure 1:
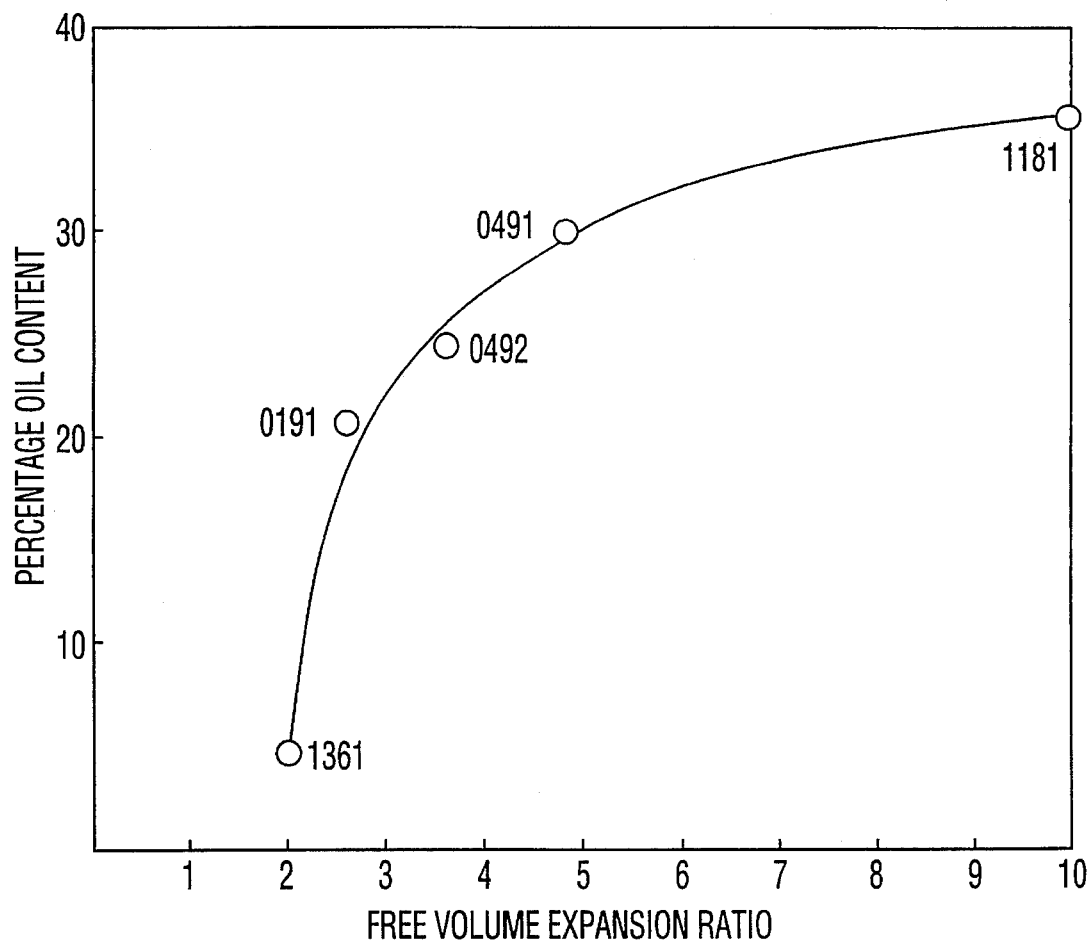
FIG. 1 is a graphical representation of the effect of the fraction percentage of oil in the composition and its accompanying effect on the free volume expansion of the product.

Having just thus generally described the invention, reference will now be made to specific examples to further illustrate the invention so that a greater understanding can be obtained.

EXAMPLES

Table 1 tabulates the results of test of various compositions in terms of their resulting free volume expansion at 250° C. The free volume expansion ratio is calculated by dividing the final volume of the intumesced composition after thirty minutes of exposure to 250° C. in a muffle furnace with subsequent equilibration to ambient temperature as compared to the initial volume, i.e.

FREE VOLUME EXPANSION RATIO = $\dfrac{\text{FINAL VOLUME (23° C.)}}{\text{INITIAL VOLUME (23° C.)}}$

TABLE 1

| BATCH No. COMPONENTS (parts by weight) | 0191 | 0183 | 0201 | 0202 | 0492 | 0491 | 0481 | 0762 | 1081 | 1181 |
|---|---|---|---|---|---|---|---|---|---|---|
| FORMULATIONS | | | | | | | | | | |
| Diol (50 Pa · s) | 150 | 150 | | 150 | 130 | 100 | 260 | 100 | 100 | 70 |
| Diol (20 Pa · s) | | | 260 | | | | | | | |
| Oil (1 Pa · s) | 110 | 110 | | 110 | 130 | 160 | | 160 | 160 | 190 |
| Silicate (C24) | 195 | 195 | 195 | 98 | 195 | 195 | 195 | 295 | | 195 |
| Silicate (H24) | | | | | | | | | | |
| Chalk | | | | | | | | | 195 | |
| Fumed Silica | 2 | 2 | 2 | 2 | 2 | 2 | 20 | 2 | 2 | 2 |
| Crosslinker | 20 | 20 | 20 | 20 | 20 | 20 | | 20 | 20 | 20 |
| Amino | 4 | 4 | 4 | 4 | 4 | 4 | | 4 | 4 | 4 |
| Graphite 3335 | 48 | | 48 | 48 | 48 | 48 | 48 | 48 | 48 | 48 |
| Graphite 3393 | | | | | | | | | | |
| FREE VOLUME EXPANSION RATIO | | | | | | | | | | |
| 250° C. | 2.5 | 2.7 | 1.8 | 2.5 | 3.6 | 4.8 | n/a | 4.9 | 1.7 | 10.0 |
| DUROMETER HARDNESS | | | | | | | | | | |
| Shore "A" | 25 | 20 | 50 | 15 | 25 | 14 | n/a | 26 | 18 | <10 |

| BATCH No. COMPONENTS (parts by weight) | 1265 | 1311 | 1361 | 1362 | 1364 | 1401 | 1711 | 2201 | 2062 |
|---|---|---|---|---|---|---|---|---|---|
| FORMULATIONS | | | | | | | | | |
| Diol (50 Pa · s) | 100 | 100 | 235 | 100 | 70 | 70 | 70 | 70 | 70 |
| Diol (20 Pa · s) | | | | | | | | | |
| Oil (1 Pa · s) | 160 | 160 | 25 | 160 | 190 | 190 | 190 | 190 | 190 |
| Silicate (C24) | 195 | 195 | 195 | 195 | 295 | 295 | 500 | 500 | |
| Silicate (H24) | | | | | | | | | 1336 |
| Chalk | | | | | | | | | |
| Fumed Silica | 2 | 2 | 2 | 2 | 2 | 2 | 2 | 2 | 2 |
| Crosslinker | 20 | 20 | 20 | 20 | 20 | 20 | 20 | 20 | 20 |
| Amino | 4 | 4 | 4 | 4 | 4 | 4 | 4 | 4 | 4 |
| Graphite 3335 | | | 48 | 96 | 48 | | 48 | | 48 |
| Graphite 3393 | | 48 | | | | 48 | | | |
| FREE VOLUME EXPANSION RATIO | | | | | | | | | |
| 250° C. | 9.7 | 7.7 | 2.0 | 4.8 | 9.0 | 9.1 | 3.8 | 4.2 | 5.4 |
| DUROMETER HARDNESS | | | | | | | | | |
| Shore "A" | 12 | 14 | 46 | 20 | 13 | 12 | n/a | n/a | n/a |

A comparison of the formulations 0191, 0183 and 0202 illustrates that at 250° C. the absence of graphite or a decrease in the level of sodium silicate from 195 to 98 parts does not result in any substantial difference in free volume expansion from 2.5 to 2.7.

A decrease in the silicate content in formulation 0202 produces an unacceptably weak and friable char at temperatures greater than 250° C. The absence of graphite in formulation 0183 results in unacceptable shrinkage of the intumescent product at temperatures higher than about 250° C.

Comparing formulations 0191, 0491, 0492, 1181 and 1361 shows that by increasing the siloxane oil versus the diol content and keeping the sodium silicate/ graphite quantities constant, a marked increase in free volume expansion at 250° C. can be realized i.e. from 2.0 to 10.0.

For the purposes of closing a 50 mm polyvinyl chloride pipe under ASTM Standard E-814, manufacturers typically prescribe a single nominal 6.4 mm thick intumescent strip 50 mm in width to be wrapped around the pipe contained within a metal collar. A calculated volume expansion of about 200%, i.e. a free volume expansion ratio of 3, would just seal the opening. A volume expansion of at least 300 to 400% is more desirable so as to provide not only a safety factor but also a firmer intumesced matrix in a constrained environment such as a metal collar. Formulation 0491 with a free volume expansion ratio of 4.8 (380%) is generally preferred to fulfil this requirement.

Formulation 0762 shows that by increasing the silicate content, thus the strength of the char, while maintaining the oil to diol ratio in formulation 0491, a comparable free volume expansion of 4.9 can be realized. At temperatures greater than 250° C., the strength of the char is superior to that of formulalation 0491. Unfortunately, the high silicate content of formulation 0762 renders the composition difficult to mix with a standard planetary mixer and may produce temperatures that could cause premature gelling.

Formulation 0481 produced a non-vulcanizing, non-tacky putty formulation while maintaining the siloxane, sodium silicate and graphite contents constant in formulation 0491.

The putty material was found to slough off at elevated temperatures and in direct flame source. It was believed that vulcanization of the siloxane base is required for the product to intumesce.

FIG. 1 shows a graphical representation of the relationship between the silicone base, in terms of the percentage oil content and the free volume expansion based on formulations 0191, 0491, 0492, 1181 and 1361. In addition, Table 2 illustrates the free volume expansion for various formulations, the contents of which are tabulated in Table 1 for temperatures from 250° C. to 575° C. as the composition intumesces in stages and at direct exposure at 575° C.

The addition of formulation 0201 in Table 1 illustrates that with the removal of the oil and replacement with a lower viscosity diol (20 Pa.s), a free volume expansion of only 1.8 can be achieved. Formulation 1081 shows that the replacement of the silicate in formulation 0491 with a non-intumescent filler, an example of which is chalk or limestone, results in the expansion ratio dropping from 4.8 to 1.7.

It will be readily appreciated that an important feature of the present invention is that the composition provides a firm char matrix regardless of whether it intumesces slowly or in stages when shielded from the flame source or rapidly when in direct contact with the flame source. Formulation 0491 is the most desirable composition in this regard.

Based on the information in Table 2, desirable features in the final intumesced product are achieved by those formulations having an oil content greater than about 20.8% by weight and more desirably 30.2% by weight.

TABLE 2

| For-mula | % Oil | FREE VOLUME EXPANSION RATIO | |
|---|---|---|---|
| | | 250° C. → 575° C. | 575° C. (direct) |
| 1361 | 4.7 | 2.0 → 3.8 (friable char) | 3.6 (rigid char) |
| 0191 | 20.8 | 2.7 → 4.2 (friable char) | 3.4 (rigid char) |
| 0491 | 30.2 | 4.8 → 4.3 (rigid char) | 4.2 (rigid char) |
| 1181 | 35.9 | 10.0 → 5.0 (rigid char) | 6.1 (rigid char) |
| 1265 | 33.3 | 9.7 → 1.5 (rigid char) | less than starting volume |
| 1311 | 30.2 | 7.7 → 17.0 (friable char) | 13.4 (friable char) |
| 1362 | 27.7 | 4.8 → 9.7 (friable char) | 9.4 (friable char) |
| 1364 | 30.2 | 9.0 → 7.0 (rigid char) | 6.7 (rigid char) |
| 1401 | 30.2 | 9.1 → 14.9 (weak char) | 10.3 (weak char) |
| 1711 | 22.8 | 3.8 → 5.4 (rigid char) | 5.7 (rigid char) |
| 2201 | 24.2 | 4.2 → 3.7 (rigid char) | 2.1 (rigid char) |
| 2062 | 11.4 | 5.4 → >5.4 (weak char) | >5.4 (weak char) |

Table 2 further shows the influence of the graphite in the 0491 formulation. Formulation 1265 is identical to 0491 but without the graphite present and thus has a slightly higher percentage of oil. The absence of the graphite results in a 9.7 free volume expansion at 250° C. which clearly exceeds that of 0491. It would appear therefore that the graphite is actually holding back the expansion of the silicate in 0491. Its presence is necessary, however, to prevent a large shrinkback at higher temperatures. Formulation 1311 is identical to 0491 except that Asbury #3393 graphite is substituted for #3335. Asbury #3393 has a rate of volume expansion of 145:1 versus 80:1 for #3335. With the substitution of Asbury #3393 the free volume expansion at 250° C. increases from 4.8 to 7.7, indicating that a higher expansion graphite may be warranted in formulation 0491. However, we find that at elevated temperatures the expansion of the #3393 graphite exceeds that of the silicate and a friable char is produced. If the amount of #3335 graphite is doubled from the 9% in 0491, i.e. 1362, a friable product is also produced.

Formulations 1364 and 1401 increase the oil versus diol content in 0491 to that in 1181, in order to accommodate more C24 (about 47% by weight). As with formulation 0762 these compositions were difficult to mix but they expanded as much as formulation 1181 which had only 36.9% by weight of C24. Formulation 1401 substituted #3393 graphite for #3335 and produced a very weak char at 575° C., in relation to formulation 1311 which produced a friable char. It would appear therefore that the upper limit for the graphite is about 17% by weight with a rate of volume expansion of no less than 80:1 and 9% by weight with a graphite having a rate of volume expansion of not greater than 145:1. It would appear therefore that the upper limit for the graphite will be roughly 17% by weight with a rate of volume expansion of no less than 80:1 and no greater than 145:1.

Experiments have been done with two silicates having silica to alkali ratios above and below the Britesil®C24, i.e. 2 and 3.22 in hydrated and anhydrous forms. These silicates were directly substituted for C24 in the 0491 formulation. In hydrated form both these silicates intumesced in much the same way as the C24, with the 3.22 silicate having an even greater free volume expansion at 250° C. Both intumesced products, however, formed slightly weaker chars at 575° C. than the C 24. The anhydrous forms produced a 'punky' intumesced product at 250° C. which became friable even when directly heated at 575° C. BRITESIL®C24 does not have an anhydrous equivalent. The silicate must therefore be hydrated (preferably about 18.5% moisture content) to produce the desired product.

Formulation 1711 increased the C24 level to the maximum it could be wetted out. At 60% by weight, the composition was able to vulcanize but produced a product with poor rubber-like properties. The free volume expansion ratio at 250° C. was 3.8 which is consistent with the data for an intumescent composition having 22.8% oil content. The free volume expansion ratio of 5.4 to 5.7 at 575° C. regardless of whether it was heated directly or in stages, indicates that the expandable graphite has less of an influence on the char dimensions at high fill levels of C24. This is borne out by formulation 2201 where the graphite was not present and the char dimensions at 575° C. were superior to those found with formulation 1265 with 40.5% parts by weight of C24.

Formulation 2062 produced a composition with 80% by weight of hydrated granular sodium silicate Britesil® H24. The formulation had an oil content of 11.4% by weight and produced an intumescable product which had a very weak and porous char at 575 ° C.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. An intumescent composition which expands and forms a composite char on heating, comprising:

an expandable intumescent graphite material being present in an amount up to 20% by weight of said composition;

a polyorganosiloxane oil compound present in an amount from about 10% to about 40% by weight of said composition;

a hydrated alkali metal silicate present in an amount of up to 80% by weight of said composition; and a silicone elastomer binder present in an amount from about 4% to about 30%, by weight of said composition;

sufficient of said oil being present to soften said elastomer and accommodate the expansion; and said intumescent graphite material being present in an amount effective to reduce shrink-back due to the silicate on heating to form char.

2. The composition as set forth in claim 1, wherein said polyorganosiloxane oil comprises polydimethyl siloxane oil.

3. The composition as set forth in claim 1, wherein said silicone elastomer binder comprises polydimethyl siloxane diol.

4. The composition as set forth in claim 1, said graphite having a rate of volume expansion of between about 80:1 and about 145:1.

5. The composition as set forth in claim 4, wherein said expandable graphite is present in said composition in an amount of about 5–17% by weight of said composition.

6. The composition as set forth in claim 1, wherein said polyorganosiloxane oil is present in an amount of about 20 to 35% by weight of said composition.

7. The composition as set forth in claim 1, wherein said hydrated alkali metal silicate is present in an amount of about 36 to 47% by weight of said composition.

8. The composition as set forth in claim 7, wherein said hydrated alkali metal silicate has a moisture content of about 18.5%.

9. The composition as set forth in claim 7, wherein said hydrated alkali metal silicate is in powder form and comprises a sodium silicate.

10. The composition as set forth in claim 1, wherein said polyorganosiloxane oil comprises an end blocked trimethyl siloxane oil.

11. The composition as set forth in claim 1, wherein said silicone elastomer binder comprises a polymerized dimethyl siloxane diol.

12. An intumescent fire stop composition comprising:

a hydrated alkali metal silicate expandable intumescent in an amount ranging from about 22 up to about 60% by weight of said composition, said silicate being subject to shrink-back at temperatures above 500° C.;

an expandable intumescent graphite, in an amount within the range of about 5 up to about 17% by weight of said composition and sufficient to reduce said shrink-back;

a silicone elastomer in an effective binding amount from about 8 to about 30% by weight of said composition; and a polyorganosiloxane oil softener in an amount from about 20 to about 40% by weight of said composition, with amounts of oil softener being selected to soften the elastomer and permit the desired expansion.

* * * * *